(12) United States Patent
Wood et al.

(10) Patent No.: US 8,156,207 B2
(45) Date of Patent: Apr. 10, 2012

(54) METHOD AND APPARATUS FOR REMOTELY CONFIGURING NETWORK DEVICES

(75) Inventors: Frank J. Wood, Elk Grove, CA (US); Olaf Borowski, Rocklin, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1178 days.

(21) Appl. No.: 10/962,315

(22) Filed: Oct. 8, 2004

(65) Prior Publication Data

US 2006/0080425 A1    Apr. 13, 2006

(51) Int. Cl.
*G06F 15/177* (2006.01)
*G06F 9/00* (2006.01)

(52) U.S. Cl. ......... 709/221; 709/220; 709/222; 713/100

(58) Field of Classification Search .......... 709/220–222; 713/100
See application file for complete search history.

(56) References Cited

U.S. PATENT DOCUMENTS

| | | | | |
|---|---|---|---|---|
| 5,838,907 A * | 11/1998 | Hansen | | 709/220 |
| 5,987,621 A * | 11/1999 | Duso et al. | | 714/4.11 |
| 6,012,100 A * | 1/2000 | Frailong et al. | | 709/250 |
| 6,169,987 B1 * | 1/2001 | Knoblock et al. | | 1/1 |
| 6,243,773 B1 * | 6/2001 | Mahalingam | | 710/302 |
| 6,263,387 B1 * | 7/2001 | Chrabaszcz | | 710/302 |
| 6,308,178 B1 * | 10/2001 | Chang et al. | | 1/1 |
| 6,578,042 B2 * | 6/2003 | Arrouye et al. | | 707/102 |
| 6,654,797 B1 * | 11/2003 | Kamper | | 709/220 |
| 6,782,474 B1 * | 8/2004 | Ylonen | | 713/162 |
| 6,934,853 B2 * | 8/2005 | Christopherson et al. | | 726/6 |
| 6,978,294 B1 * | 12/2005 | Adams et al. | | 709/217 |
| 7,013,331 B2 * | 3/2006 | Das | | 709/220 |
| 7,054,924 B1 * | 5/2006 | Harvey et al. | | 709/220 |
| 7,058,847 B1 * | 6/2006 | Guzman et al. | | 714/4 |
| 7,203,740 B1 * | 4/2007 | Putzolu et al. | | 709/220 |
| 7,219,141 B2 * | 5/2007 | Bonasia et al. | | 709/220 |
| 7,373,544 B2 * | 5/2008 | Guzman et al. | | 714/4 |
| 7,395,359 B2 * | 7/2008 | Reister | | 710/8 |
| 7,774,441 B2 * | 8/2010 | Frutiger et al. | | 709/221 |
| 2002/0069272 A1 * | 6/2002 | Kim et al. | | 709/221 |
| 2002/0161874 A1 * | 10/2002 | McGuire | | 709/223 |
| 2002/0191619 A1 * | 12/2002 | Shafer | | 370/401 |
| 2003/0037128 A1 * | 2/2003 | Beadles et al. | | 709/220 |
| 2003/0149751 A1 * | 8/2003 | Bellinger et al. | | 709/220 |
| 2005/0204022 A1 * | 9/2005 | Johnston et al. | | 709/220 |

* cited by examiner

*Primary Examiner* — Kenny Lin
*Assistant Examiner* — Guang Li

(57) ABSTRACT

A preferred embodiment apparatus for configuring network devices in a network includes a controller provided at a remote location on the network for receiving a configuration request from a user to configure a select user defined device. The controller translates the configuration request to another configuration request, and issues the translated configuration request to a select network device corresponding to the select user defined device for configuring the select network device. A translation enabling part allows the controller to translate the first configuration request received from the user to the second configuration request issued to the select network device.

17 Claims, 3 Drawing Sheets

METHOD AND APPARATUS FOR REMOTELY CONFIGURING NETWORK DEVICES

BACKGROUND OF THE INVENTION

A typical a network environment includes a number of user devices such as computers and workstations, and network devices such as routers, hubs, switches, firewalls and load balancers. A local area network (LAN), a wide area network (WAN), and the Internet are examples of known computing or communication networks.

Network devices in a given network are typically provided by different vendors, and they are configured according to the specifications of those vendors. When added to the network, the network devices are initially configured so that they are operationally synchronized with each other. However, when a network device fails or goes off-line for whatever reason, and then comes back on-line, the configuration of that network device may no longer be in sync with the other network devices.

In a high availability (HA) network environment, back-up network devices are typically connected to the network, so that in the event of a failure of the primary network device, the back-up device can be brought on-line in place of the primary device. Before the back-up network devices can be operational, a user has to either physically go to the location of the back-up device and provide commands to configure it to synchronize with the other devices already operational in the network, or individually access the affected back-up device through the network.

SUMMARY OF THE INVENTION

The present invention relates generally an apparatus and a method for configuring network devices in a network. The preferred embodiment of the apparatus includes a controller provided at a remote location on the network for receiving a configuration request from a user to configure a select user defined device. The controller translates the configuration request to another configuration request, and issues the translated configuration request to a select network device corresponding to the select user defined device. A translation enabling part allows the controller to translate the first configuration request received from the user to the second configuration request issued to the select network device.

DETAILED DESCRIPTION

Broadly stated, the present invention is directed to apparatus and methods for configuring network devices from a remote location on the network. In accordance with one embodiment of the present invention, a network device manager is provided on the network and includes a controller for receiving a configuration request from a user for configuring a select user defined device. The controller translates the configuration request from the user to a configuration request understood by the select network device corresponding to the select user defined device, and then issues the translated configuration request to the select network device for configuring it in accordance with the request. The translation of the configuration request from the user is provided by a plug-in corresponding to the select network device, which is retrieved from storage. After the controller has successfully translated and sent the configuration request to the device, it stores the translated configuration request in an internal database. This enables the controller to rebuild the configuration for that device in case of a failure of that device.

Figure 1:
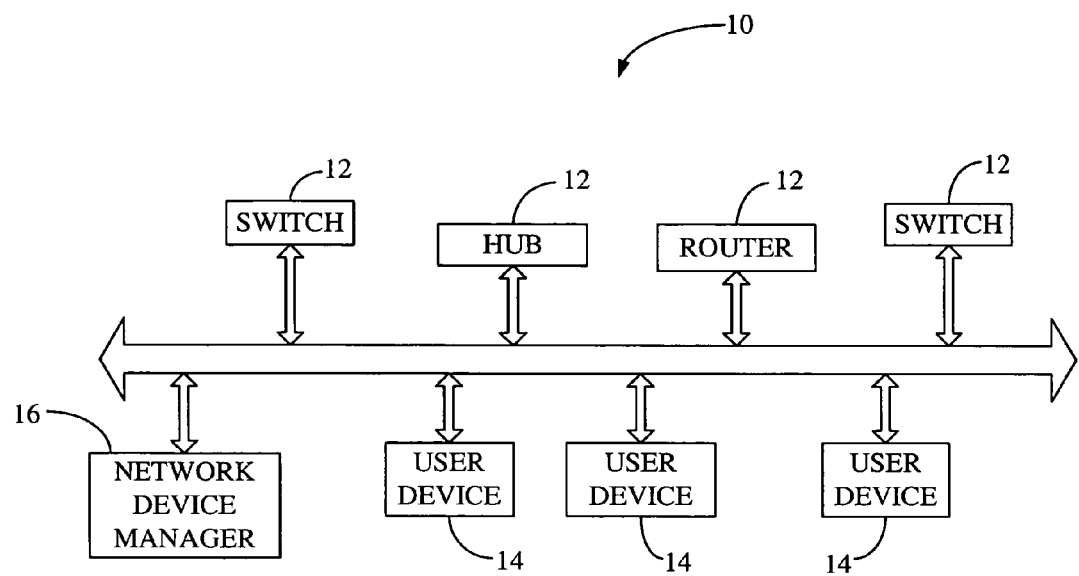
FIG. 1 is a diagram of a network environment in which one embodiment of the present invention is implemented.

Turning now to FIG. 1, a network 10 in accordance with one embodiment of the present invention includes a number of network devices 12, a number of user devices 14 and a network device manager 16. In FIG. 1, the network 10 shown is a LAN. It should be understood, however, that the invention may be implemented in other types of networks, including a WAN or the Internet, for example.

The network devices 12 are physical devices such as, for example, switches, routers and hubs. The user devices 14 may be any computing devices such as personal computers or workstations that are in communication with the network devices 12. The network device manager 16 generally maintains the health of the network 10, making sure all network devices 12 are running properly. The network device manager 16 may be a stand-alone device connected to the network 10, as shown in FIG. 1. Alternatively, the network device manager 16 may also be incorporated into a server as a hardware or a software module.

More specifically, the network device manager 16 is connected to the network 10 for configuring or reconfiguring the network devices 12 in accordance with requests received from a user, and for maintaining a record of the configuration states of the network devices. In operation, the network device manager 16 receives "virtual requests" from a user for configuring network devices 12. The requests are "virtual requests" because they are in a language understood by the user and the device manager 16, but not necessarily by the targeted network devices 12. Also, the network devices 12 identified in the virtual configuration requests are "virtual network devices" since they do not necessarily correspond directly to the actual designation of the physical network device 12 in the network 10.

The network device manager 16 translates a virtual request into a request appropriate for the target physical network device 12 corresponding to the virtual network device. This translation is performed using a software plug-in for the appropriate physical network device 12. As generally known, a plug-in is a hardware or software module that adds a specific feature or service to a system. Using a plug-in, a new feature can be "plugged" in to the existing system. In the present invention, a plug-in is a software module written according to the remote configuration capabilities of the physical network devices 12 (SNMP, Command Line Interface, XML, etc.). For example, when the user issues a request (i.e., a virtual configuration request) to create VLAN 1000 on virtual device 192.168.1.1, the device manager 16 correlates the request to the physical network device 12 for 192.168.1.1. The virtual configuration request is issued by the user in a generic form, for example, "create VLAN 1000 on device 192.168.1.1". The device manager 16 then locates the appropriate software plug-in for the physical network device 12, and attempts to physically create VLAN 1000 on the physical network device corresponding to virtual device 192.168.1.1.

Figure 2:
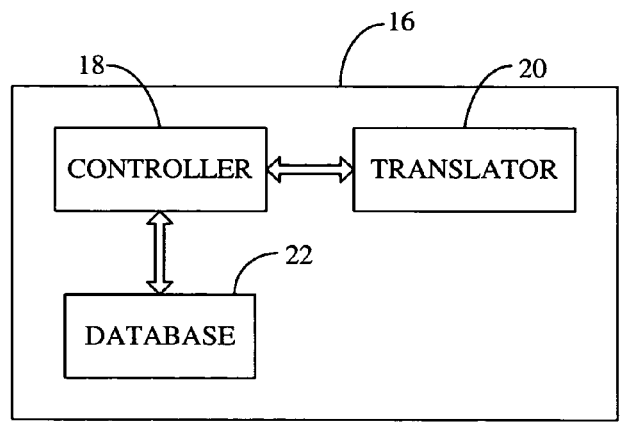
FIG. 2 is a block diagram of a network device manager shown in FIG. 1.

Referring to FIG. 2, the network device manager 16 includes a controller 18 for communicating with and performing configuration related functions requested by a user. A translator 20 is operatively connected to the controller 18, and may be in the form of a database, a look-up table, or a software library for storing plug-ins corresponding to the physical network devices 12. The device manager 16 also includes a database 22 for storing information relating to the configuration states of the virtual network devices such as, for example, port attributes (VLAN membership, security, packet priority), global settings (Spanning-Tree, Routing, ACLs). The database 22 is implemented using a relation database or some file store in which the configuration information would be written to a long-term storage device such as a hard drive, for example.

Figure 3:
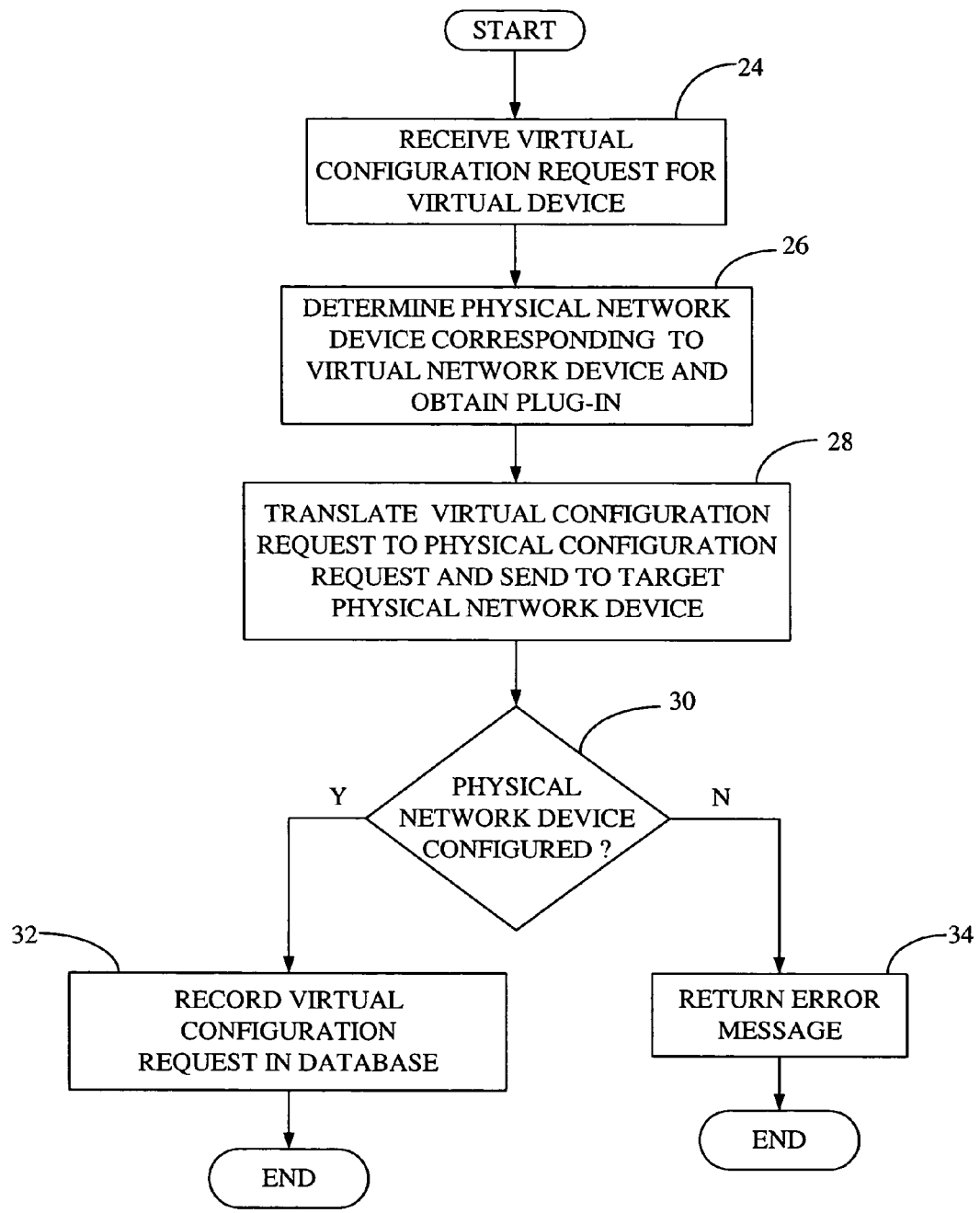
FIG. 3 is a flowchart describing a process for configuring network devices in accordance with the present invention; and, FIG. 4 is a flowchart describing a process for reconfiguring a network device to the previously recorded state in accordance with the present invention.

As now described in more detail, the network device manager 16 enables a user to change the configurations of the network device 12 from a remote location on the network 10, and set the network devices to a previously known configuration states. Referring to FIG. 3, a process for setting a select or target network device 12 to a desired configuration is described in accordance with one embodiment of the present invention. When a virtual configuration request for a virtual network device issued by a user is received by the controller 18 of the device manager 16 (block 24), the controller 18 determines the target physical network device 12 corresponding to the virtual network device identified in the virtual request, and accesses the translator 20 for the plug-in associated with the target physical network device (block 26). In the preferred embodiment, the configuration request may be made by a user through any of the user devices 14 in the network 10, or through a user interface (not shown) incorporated in the network device manager 16. Using this plug-in, the controller 18 translates the virtual configuration request which is in the user language, to a physical configuration request understood by the target physical network device 12 and sends the configuration request to the target physical network device (block 28).

If the target physical network device 12 is successfully configured as requested by the controller 18 (block 30), the virtual configuration request issued by the user for the target virtual device is recorded in the database 22 (block 32). If, on the other hand, the target physical network device 12 corresponding to the target virtual device is not successfully configured, then the controller 18 returns an error message to the user (block 34).

Figure 4:
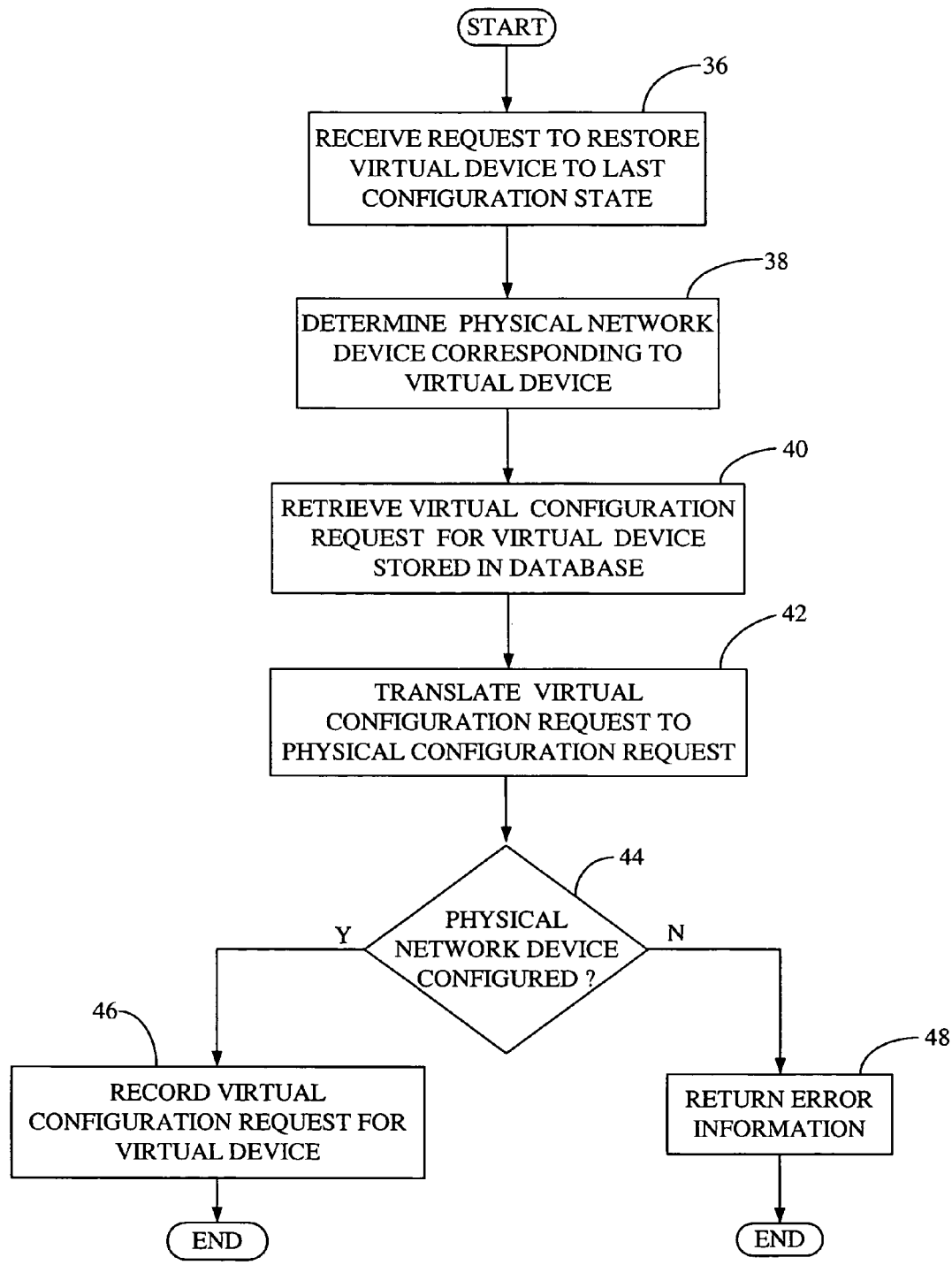

Turning now to FIG. 4, a process is described in which the network device manager 16 configures, or reconfigures, a network device 12 to the last known configuration state. This may be required, for example, after the target network device 12 comes back on-line after being taken off-line, after a recovery from a fault, or when a failed primary network device is replaced with a new back-up network device 12. When the controller 18 of the device manager 16 receives a request (i.e., a virtual request) from a user to restore a select network device (i.e., a virtual device) to the last known configuration state (block 36), it determines the physical network device 12 corresponding to the virtual device (block 38).

Once the physical network device 12 has been determined, the controller 18 retrieves the virtual configuration request previously issued for configuring the select virtual device corresponding to the target physical network device 12 from the database 28 (block 40). Using the plug-in in the translator 20 associated with the target physical network device 12, the controller 18 translates the virtual configuration request retrieved from database 22 into a physical configuration information understood by the target physical network device 12 (block 42).

If the target physical network device 12 is successfully configured as requested by the controller 18 (block 44), the virtual configuration request retrieved from the database 28 is again recorded in the database (block 46). If, on the other hand, the target physical network device 12 is not successfully configured, then the controller 18 returns an error message to the user (block 48).

While various embodiments of the present invention have been shown and described, it should be understood that other modifications, substitutions, and alternatives are apparent to one of ordinary skill in the art. Such modifications, substitutions, and alternatives can be made without departing from the spirit and scope of the invention, which should be determined from the appended claims.

Various features of the present invention are set forth in the appended claims.

What is claimed is:

1. A method for remotely configuring network devices on a physical network having at least one user device and a network device manager, said method comprising:

issuing a first configuration request from said at least one user device to said network device manager on the physical network to configure a select user defined virtual network device in a virtual network, wherein said first configuration request is in a first language understandable by said network device manager;

determining a select physical network device located remotely from said network device manager on the physical network corresponding to said select user defined virtual network device;

translating said first configuration request to a second configuration request using a plug-in stored in said network device manager specific to said select physical network device, wherein said second configuration request is in a second language operatively understandable by said select physical network device;

issuing said second configuration request from said select network device manager to said select physical network device on the physical network for configuring said select physical network device;

determining whether said select physical network device has been successfully configured in accordance with said second configuration request;

storing said first configuration request in a database in said network device manager if said select physical network device has been successfully configured in accordance with said second configuration request;

retrieving said first configuration request stored in said database when a replacement-physical network device for said select physical network device requires configuration in accordance with said second configuration request;

translating said first configuration request to said second configuration request; and issuing said second configuration request from said select network device manager to said replacement-physical network device for configuring said replacement-physical network device.

2. The method as defined in claim 1 further comprising:

retrieving said first configuration request stored in said database when said select physical network device corresponding to said user defined virtual network device requires reconfiguration in accordance with said second configuration request;

translating said first configuration request to said second configuration request; and issuing said second configuration request to said select physical network device for reconfiguring said select physical network.

3. The method as defined in claim 2 further comprising, storing said first configuration request in said database when said select physical network device has been reconfigured in accordance with said second configuration request.

4. The method as defined in claim 1 further comprising, storing said first configuration request in said database when said replacement physical network device has been reconfigured in accordance with said second configuration request.

5. An apparatus provided in a physical network for remotely configuring physical network devices on the physical network, comprising:

a controller for receiving a first configuration request, in a first language understandable by a network device manager, from a user device to configure a select user defined virtual network device in a virtual network, translating said first configuration request to a second configuration request, in a second language operatively understandable by said select physical network device, issuing said second configuration request to a select physical network device corresponding to said select user defined virtual network device and remotely located on the network for configuring said select physical network device, and determining whether said select physical network device has been successfully configured in accordance with said second configuration request;

a plug-in specific to said select physical network device for enabling said controller to translate said first configuration request to said second configuration request; and a database for storing said first configuration request if said select network device has been successfully configured in accordance with said second configuration request, wherein said controller retrieves said first configuration request stored in said database when a replacement-physical network device for said select physical network device requires configuration in accordance with said second configuration request, translates said first configuration request to said second configuration request, and issues said second configuration request to said replacement physical network device for configuring said replacement physical network device.

6. The apparatus as defined in claim 5, wherein said controller retrieves said first configuration request stored in said database when said select physical network device corresponding to said select user defined virtual network device requires reconfiguration in accordance with said second configuration request, translates said first configuration request to said second configuration request, and issues said second configuration request to said select physical network device for reconfiguring said select physical network device.

7. The apparatus as defined in claim 6, wherein said controller stores said first configuration request in said database when said select physical network device has been reconfigured in accordance with said second configuration request.

8. The apparatus as defined in claim 5, wherein said controller stores said first configuration request in said database when said replacement physical network device has been configured in accordance with said second configuration request.

9. The apparatus as defined in claim 5, wherein said controller is incorporated into a server connected to the physical network.

10. The apparatus as defined in claim 5, wherein said controller is a stand-alone device in communication with the physical network.

11. The apparatus as defined in claim 5, wherein the physical network comprises a local area network (LAN) or a wide area network (WAN).

12. The apparatus as defined in claim 5, wherein said select physical network device comprises one of a switch, a hub, and a router.

13. The method as defined in claim 1, wherein said select physical network device comprises one of a switch, a hub, and a router.

14. An apparatus provided in a physical network for remotely configuring physical network devices on the physical network, comprising:

a controller for receiving a first configuration request, in a first language understandable by a network device manager, from a user device to configure a select user defined virtual network device in a virtual network, translating said first configuration request to a second configuration request, in a second language operatively understandable by said select physical network device, issuing said second configuration request to a select physical network device corresponding to said select user defined virtual network device and remotely located on the network for configuring said select physical network device, and determining whether said select physical network device has been successfully configured in accordance with said second configuration request;

a plug-in specific to said select physical network device for enabling said controller to translate said first configuration request to said second configuration request; and a database for storing said first configuration request if said select network device has been successfully configured in accordance with said second configuration request, wherein said controller retrieves said first configuration request stored in said database when a replacement physical network device for said select physical network device requires configuration in accordance with said second configuration request, translates said first configuration request to said second configuration request, and issues said second configuration request to said replacement-physical network device for configuring said replacement physical network device, wherein said select physical network device comprises one of a switch, a hub, and a router, wherein said controller stores said first configuration request in said database after said replacement physical network device has been configured in accordance with said second configuration request, wherein said controller retrieves said first configuration request stored in said database when said select physical network device corresponding to said select user defined virtual network device requires reconfiguration in accordance with said second configuration request, translates said first configuration request to said second configuration request, and issues said second configuration request to said select physical network device for reconfiguring said select physical network device, and wherein said controller stores said first configuration request in said database after said select physical network device has been reconfigured in accordance with said second configuration request.

15. The apparatus as defined in claim 14, wherein said controller is incorporated into a server connected to the physical network.

16. The apparatus as defined in claim 14, wherein said controller is a stand-alone device in communication with the physical network.

17. The apparatus as defined in claim 14, wherein the physical network comprises a local area network (LAN) or a wide area network (WAN).

* * * * *